US012500323B2

(12) United States Patent
Ashida et al.

(10) Patent No.: US 12,500,323 B2
(45) Date of Patent: Dec. 16, 2025

(54) MULTILAYERED FILTER DEVICE

(71) Applicant: TDK CORPORATION, Tokyo (JP)

(72) Inventors: Yuta Ashida, Tokyo (JP); Masahiro Tatematsu, Tokyo (JP); Shuhei Sawaguchi, Tokyo (JP); Keigo Shibuya, Tokyo (JP); Tetsuzo Goto, Tokyo (JP)

(73) Assignee: TDK CORPORATION, Tokyo (JP)

( * ) Notice: Subject to any disclaimer, the term of this patent is extended or adjusted under 35 U.S.C. 154(b) by 444 days.

(21) Appl. No.: 18/174,965

(22) Filed: Feb. 27, 2023

(65) Prior Publication Data

US 2023/0282953 A1 Sep. 7, 2023

(30) Foreign Application Priority Data

Mar. 4, 2022 (JP) ................................ 2022-033472

(51) Int. Cl.
*H01P 1/203* (2006.01)
*H01P 1/207* (2006.01)
*H01P 7/06* (2006.01)

(52) U.S. Cl.
CPC .......... *H01P 1/207* (2013.01); *H01P 1/20345* (2013.01); *H01P 7/06* (2013.01)

(58) Field of Classification Search
CPC .. H01P 1/203; H01P 1/20327; H01P 1/20336; H01P 1/20345; H01P 1/20354; H01P 1/20363; H01P 1/207; H01P 7/06; H01P 7/08; H01P 7/082; H01P 7/084
See application file for complete search history.

(56) References Cited

U.S. PATENT DOCUMENTS

2018/0226934 A1 8/2018 Ashida et al.
2020/0303798 A1 9/2020 Ashida et al.

FOREIGN PATENT DOCUMENTS

JP 2020-155836 A 9/2020

OTHER PUBLICATIONS

Translation of May 13, 2025 Office Action issued in Japanese Patent Application No. 2022-033472.

*Primary Examiner* — Stephen E. Jones
(74) *Attorney, Agent, or Firm* — Oliff PLC

(57) ABSTRACT

A filter device includes a ground conductor layer, at least one through hole electrically connected to the ground conductor layer, a first resonator conductor layer and a second resonator conductor layer arranged to sandwich the at least one through hole, and a stack. The first resonator conductor layer extends in a first direction becoming away from the at least one through hole, i.e., the −X direction. The second resonator conductor layer extends in a second direction becoming away from the at least one through hole, i.e., the X direction.

6 Claims, 8 Drawing Sheets

MULTILAYERED FILTER DEVICE

CROSS REFERENCE TO RELATED APPLICATIONS

This application claims the benefit of Japanese Priority Patent Application No. 2022-033472 filed on Mar. 4, 2022, the entire contents of which are incorporated herein by reference.

BACKGROUND OF THE INVENTION

1. Field of the Invention

The present invention relates to a multilayered filter device including two resonators.

2. Description of the Related Art

One of electronic components used in communication apparatuses is a band-pass filter including a plurality of resonators. Each of the plurality of resonators includes, for example, a conductor portion extending in one direction. Miniaturization is required especially for band-pass filters to be used for small communication apparatuses. As band-pass filters suitable for miniaturization, band-pass filters using a stack including a plurality of dielectric layers stacked together and a plurality of conductor layers are known.

US 2018/0226934 A1 discloses a band-pass filter including four quarter-wave resonators and using a stack including a plurality of dielectric layers stacked together and a plurality of conductor layers. In this band-pass filter, two of the resonators are configured by two resonator conductor portions each having a shape extending in the X direction and the two other resonators are configured by two resonator conductor portions each having a shape extending in the Y direction.

In such band-pass filters using a stack, conductor layers and through holes are misaligned due to manufacturing variations in some cases. Here, assume a case where the two resonator conductor portions each having a shape extending in the Y direction are misaligned in the Y direction in the band-pass filter disclosed in US 2018/0226934 A1. In this case, the two resonator conductor portions are both increased or decreased in length. Some characteristics of the resonator change according to the lengths of the resonator conductor portions. Hence, when the two resonator conductor portions similarly change in length, the characteristics of the two resonators also change similarly. Consequently, characteristics largely change as the entire band-pass filter in some cases.

SUMMARY OF THE INVENTION

An object of the present invention is to provide a multilayered filter device in which characteristic change due to manufacturing variations can be suppressed.

A multilayered filter device of the present invention includes: a ground conductor layer electrically connected to ground; at least one through hole electrically connected to the ground conductor layer; a first resonator conductor layer and a second resonator conductor layer arranged to sandwich the at least one through hole; and a stack including a plurality of dielectric layers stacked together and being for integrating the ground conductor layer, the at least one through hole, the first resonator conductor layer, and the second resonator conductor layer. The first resonator conductor layer extends in a first direction becoming away from the at least one through hole. The second resonator conductor layer extends in a second direction becoming away from the at least one through hole.

In the multilayered filter device of the present invention, each of the first resonator conductor layer and the second resonator conductor layer may configure a resonator with one end being short-circuited and another end being open. In this case, each of the first resonator conductor layer and the second resonator conductor layer may be electrically connected to the at least one through hole.

In the multilayered filter device of the present invention, the at least one through hole may include a plurality of through holes arranged in a direction orthogonal to a stacking direction of the plurality of dielectric layers and orthogonal to at least one of the first direction and the second direction.

In the multilayered filter device of the present invention, the first direction and the second direction may be directions opposite to each other.

The multilayered filter device of the present invention may further include: a third resonator conductor layer coupled with the first resonator conductor layer; and a fourth resonator conductor layer coupled with the second resonator conductor layer.

In the multilayered filter device of the present invention, the first resonator conductor layer extends in a first direction becoming away from the at least one through hole, and the second resonator conductor layer extends in a second direction becoming away from the at least one through hole. The at least one through hole is electrically connected to the ground conductor layer, and the ground conductor layer is electrically connected to the ground. With these, according to the present invention, it is possible to provide a multilayered filter device in which characteristic change due to manufacturing variations can be suppressed.

Other and further objects, features, and advantages of the present invention will appear more fully from the following description.

DETAILED DESCRIPTION OF THE PREFERRED EMBODIMENTS

First Embodiment

Figure 1:
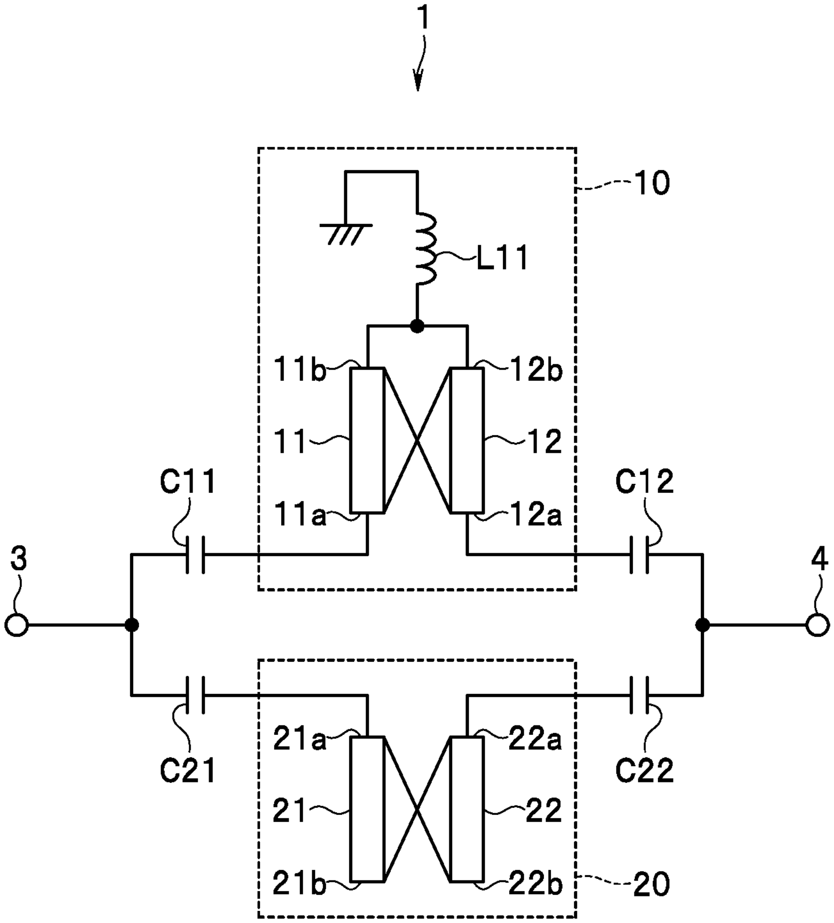
FIG. 1 is a circuit diagram illustrating a circuit configuration of a multilayered filter device according to a first embodiment of the present invention.

Preferred embodiments of the present invention will now be described in detail with reference to the drawings. First, reference is made to FIG. 1 to describe an overview of a configuration of a multilayered filter device (referred to simply as a filter device below) 1 according to a first embodiment of the present invention. The filter device 1 includes two ports 3 and 4, a first resonant circuit 10, and a second resonant circuit 20. Each of the ports 3 and 4 is a port for input or output of a signal.

In the present embodiment, the first resonant circuit 10 configures a band-pass filter, and the second resonant circuit 20 configures a band elimination filter. In the present embodiment, in particular, the first resonant circuit 10 is a master resonant circuit, and the second resonant circuit 20 is a slave resonant circuit. The filter device 1 as a whole functions as a band-pass filter.

The first resonant circuit 10 is provided between the two ports 3 and 4 in a circuit configuration. The first resonant circuit 10 is coupled with both of the two ports 3 and 4. Note that, as used herein, the phrase "in a circuit configuration" is to describe layout in a circuit diagram, not in a physical configuration.

The second resonant circuit 20 is provided between the two ports 3 and 4 in the circuit configuration. The second resonant circuit 20 is coupled with at least one of the two ports 3 and 4. In the present embodiment, in particular, the second resonant circuit 20 is coupled with both of the two ports 3 and 4. Note that, in the present embodiment, the second resonant circuit 20 is provided in parallel with the first resonant circuit 10 between the two ports 3 and 4 in the circuit configuration and is not provided between the first resonant circuit 10 and the port 3 or the port 4.

The filter device 1 further includes two first capacitors C11 and C12 capacitive-coupling the first resonant circuit 10 and the two ports 3 and 4, respectively. The first capacitor C11 capacitive-couples the first resonant circuit 10 and the port 3. The first capacitor C12 capacitive-couples the first resonant circuit 10 and the port 4.

The filter device 1 further includes at least one second capacitor capacitive-coupling the second resonant circuit 20 and the two ports 3 and 4. In the present embodiment, in particular, the filter device 1 includes two second capacitors C21 and C22 as the at least one second capacitor. The second capacitor C21 capacitive-couples the second resonant circuit 20 and the port 3. The second capacitor C22 capacitive-couples the second resonant circuit 20 and the port 4.

Coupling of the second resonant circuit 20 and the two ports 3 and 4 is weaker than coupling of the first resonant circuit 10 and the two ports 3 and 4. When coupling between a resonant circuit and a port is capacitive coupling as in the present embodiment, the coupling becomes stronger as the capacitance of the capacitor capacitive-coupling the resonant circuit and the port increases. In other words, the coupling between the resonant circuit and the port becomes weaker as the capacitance decreases.

In the present embodiment, the capacitance of each of the second capacitors C21 and C22 is smaller than the capacitance of each of the first capacitors C11 and C12. Consequently, each of the coupling between the second resonant circuit 20 and the port 3 and the coupling between the second resonant circuit 20 and the port 4 is weaker than each of the coupling between the first resonant circuit 10 and the port 3 and the coupling between the first resonant circuit 10 and the port 4. In an example, the capacitance of each of the second capacitors C21 and C22 is 0.03 pF, and the capacitance of each of the first capacitors C11 and C12 is 0.14 pF.

Note that the first resonant circuit 10 may directly be coupled with each of the ports 3 and 4. When the resonant circuit and the port are directly coupled with each other, substantially the same applies to a high-frequency region as that of a case of capacitive coupling using infinite capacitance. Accordingly, in this case, each of the coupling between the first resonant circuit 10 and the port 3 and the coupling between the first resonant circuit 10 and the port 4 is stronger than that in a case of capacitive-coupling by the first capacitors C11 and C12.

Reference is now made to FIG. 1 to describe an example of a configuration of each of the first and the second resonant circuits 10 and 20. First, the first resonant circuit 10 will be described. The first resonant circuit 10 includes a plurality of first resonators. In the present embodiment, in particular, the first resonant circuit 10 includes, as a plurality of first resonators, two first resonators 11 and 12 arranged in this order from the port-3 side in the circuit configuration. Each of the first resonators 11 and 12 is a quarter-wave resonator with one end being short-circuited and the other end being open. The first resonators 11 and 12 are magnetically coupled with each other.

The first resonator 11 is coupled with the port 3. The first resonator 11 has a first end 11*a* being closest to the port 3 and a second end 11*b* being furthest from the port 3. The first capacitor C11 is provided between the first end 11*a* of the first resonator 11 and the port 3 in the circuit configuration.

The first resonator 12 is coupled with the port 4. The first resonator 12 has a first end 12*a* being closest to the port 4 and a second end 12*b* being furthest from the port 4. The first capacitor C12 is provided between the first end 12*a* of the first resonator 12 and the port 4 in the circuit configuration.

The second end 11*b* of the first resonator 11 and the second end 12*b* of the first resonator 12 are each connected to the ground. In FIG. 1, the reference numeral L11 represents an inductance component of a line connecting the first resonators 11 and 12 and the ground.

Next, the second resonant circuit 20 will be described. The second resonant circuit 20 includes a plurality of second resonators. In the present embodiment, in particular, the second resonant circuit 20 includes, as a plurality of second resonators, two second resonators 21 and 22 arranged in this order from the port-3 side in the circuit configuration. Each of the second resonators 21 and 22 is a half-wave resonator with open ends. The second resonators 21 and 22 are magnetically coupled with each other.

The second resonator 21 is coupled with the port 3. The second resonator 21 has a first end 21*a* being closest to the port 3 and a second end 21*b* being furthest from the port 3. The second capacitor C21 is provided between the first end 21*a* of the second resonator 21 and the port 3 in the circuit configuration.

The second resonator 22 is coupled with the port 4. The second resonator 22 has a first end 22*a* being closest to the port 4 and a second end 22*b* being furthest from the port 4. The second capacitor C22 is provided between the first end 22*a* of the second resonator 22 and the port 4 in the circuit configuration.

Figure 2:
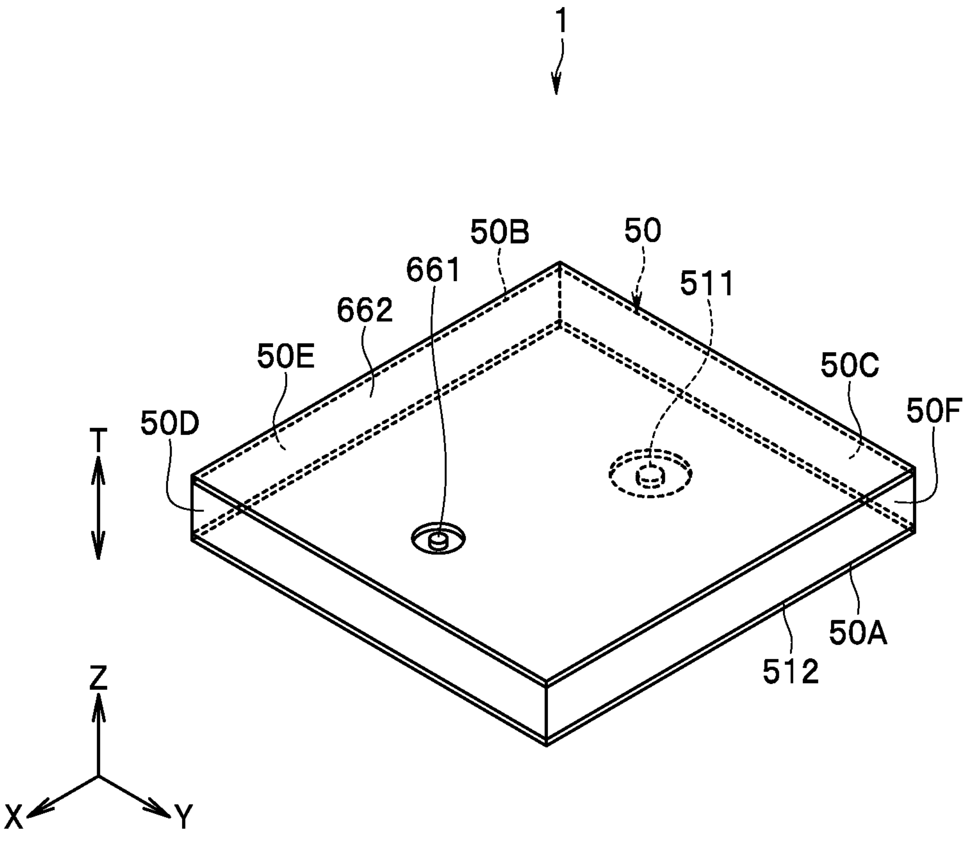
FIG. 2 is a perspective view illustrating an external view of the multilayered filter device according to the first embodiment of the present invention.

Reference is now made to FIG. 2 to described other configurations of the filter device 1. FIG. 2 is a perspective view illustrating an external view of the filter device 1.

The filter device 1 further includes a stack 50. The stack 50 includes a plurality of dielectric layers stacked together and a plurality of conductor layers and a plurality of through holes formed in the plurality of dielectric layers. The ports 3 and 4, the first resonant circuit 10, the second resonant circuit 20, the first capacitors C11 and C12, and the second capacitors C21 and C22 are integrated into the stack 50.

The stack 50 has a bottom surface 50A and a top surface 50B located at opposite ends of the plurality of dielectric layers in a stacking direction T, and four side surfaces 50C to 50F connecting the bottom surface 50A and the top surface 50B. The side surfaces 50C and 50D face opposite to each other, and also the side surfaces 50E and 50F face opposite to each other. The side surfaces 50C to 50F are perpendicular to the top surface 50B and the bottom surface 50A.

Here, X, Y, and Z directions are defined as illustrated in FIG. 2. The X, Y, and Z directions are orthogonal to one another. In the present embodiment, the Z direction is a direction parallel to the stacking direction T. The direction opposite to the X direction is −X direction, the direction opposite to the Y direction is −Y direction, and the direction opposite to the Z direction is −Z direction.

As illustrated in FIG. 2, the bottom surface 50A is located at a −Z-direction end of the stack 50. The top surface 50B is located at a Z-direction end of the stack 50. The side surface 50C is located at a −X-direction end of the stack 50. The side surface 50D is located at an X-direction end of the stack 50. The side surface 50E is located at a −Y-direction end of the stack 50. The side surface 50F is located at a Y-direction end of the stack 50.

The filter device 1 further includes terminals 511 and 661 and ground conductor layers 512 and 662. The terminal 511 and the ground conductor layer 512 are arranged at the bottom surface 50A. In the present embodiment, in particular, the ground conductor layer 512 covers the bottom surface 50A almost entirely. A gap is formed between the terminal 511 and the ground conductor layer 512.

The terminal 661 and the ground conductor layer 662 are arranged at the top surface 50B. In the present embodiment, in particular, the ground conductor layer 662 covers the top surface 50B almost entirely. A gap is formed between the terminal 661 and the ground conductor layer 662.

The terminal 511 corresponds to the port 3, and the terminal 661 corresponds to the port 4. The ground conductor layers 512 and 662 are each connected to the ground.

Reference is now made to FIG. 3 to FIG. 9 to describe an example of the plurality of dielectric layers and the plurality of conductor layers constituting the stack 50. In this example, the stack 50 includes sixteen dielectric layers stacked together. The sixteen dielectric layers will be referred to below as the first to sixteenth dielectric layers in the order from bottom to top. The first to sixteenth dielectric layers are denoted by reference numerals 51 to 66, respectively. In FIG. 3 to FIG. 9, each circle represents a through hole.

Figure 3:
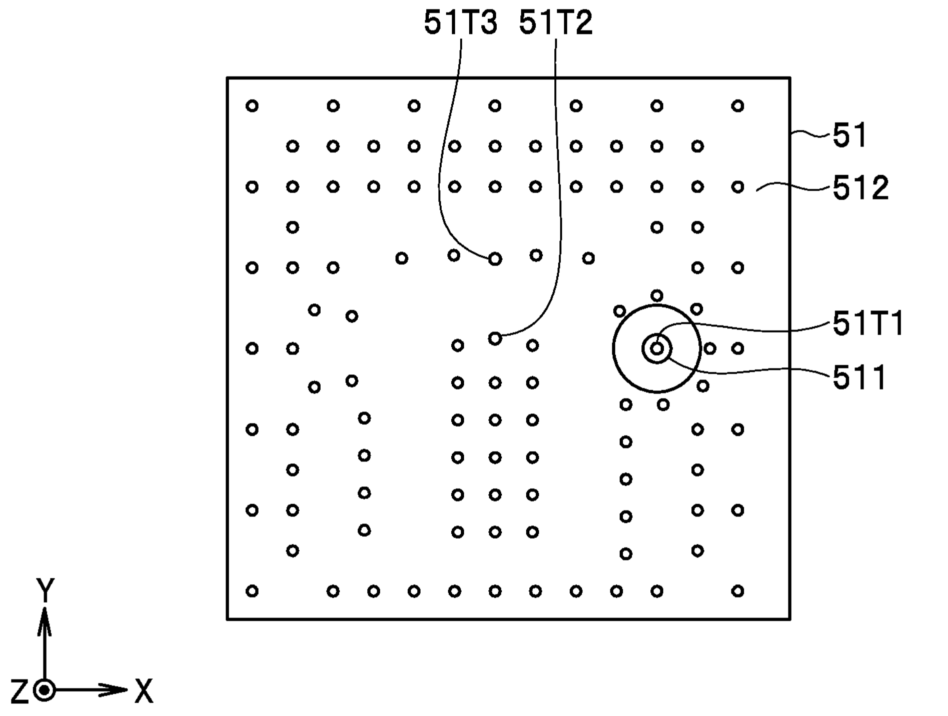
FIG. 3 is an explanatory diagram illustrating a patterned surface of a first dielectric layer in a stack of the multilayered filter device according to the first embodiment of the present invention.

FIG. 3 illustrates a patterned surface of the first dielectric layer 51. The terminal 511 and the ground conductor layer 512 are formed on the patterned surface of the dielectric layer 51. A particular through hole 51T1 connected to the terminal 511 is formed in the dielectric layer 51. A plurality of through holes formed in the dielectric layer 51 excluding the particular through hole 51T1 are connected to the ground conductor layer 512. The plurality of through holes connected to the ground conductor layer 512 include particular through holes 51T2 and 51T3.

Figure 4:
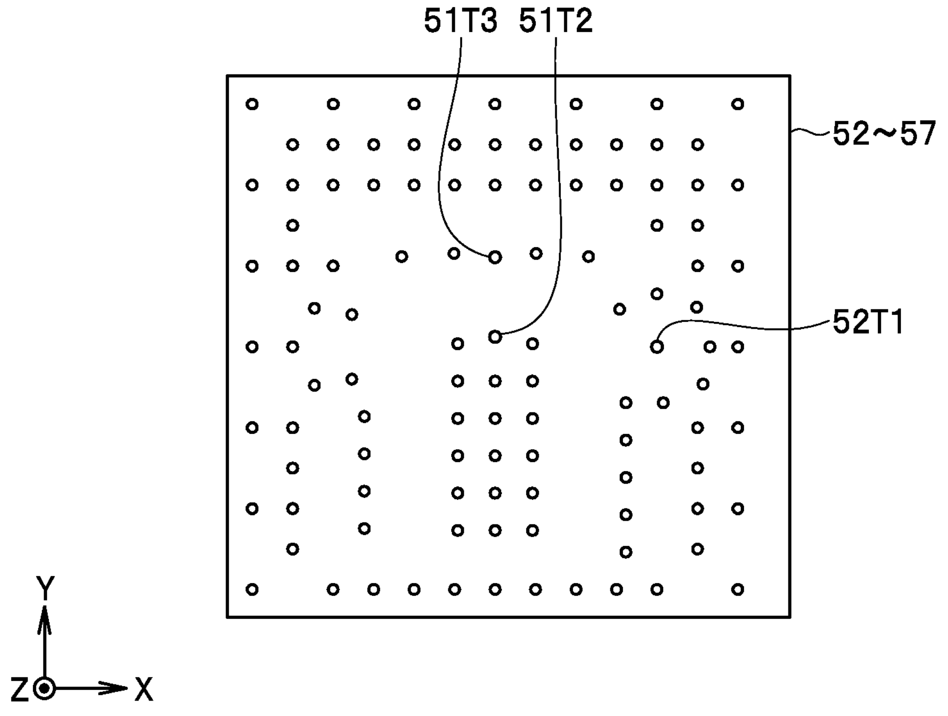
FIG. 4 is an explanatory diagram illustrating a patterned surface of each of second to seventh dielectric layers in the stack of the multilayered filter device according to the first embodiment of the present invention.

FIG. 4 illustrates a patterned surface of each of the second to seventh dielectric layers 52 to 57. Particular through holes 52T1, 52T2, and 52T3 are formed in each of the dielectric layers 52 to 57. The particular through holes 51T1 to 51T3 formed in the dielectric layer 51 are connected respectively to the particular through holes 52T1 to 52T3 formed in the dielectric layer 52. In the dielectric layers 52 to 57, every vertically adjacent through holes denoted by the same reference signs are connected to each other.

Figure 5:
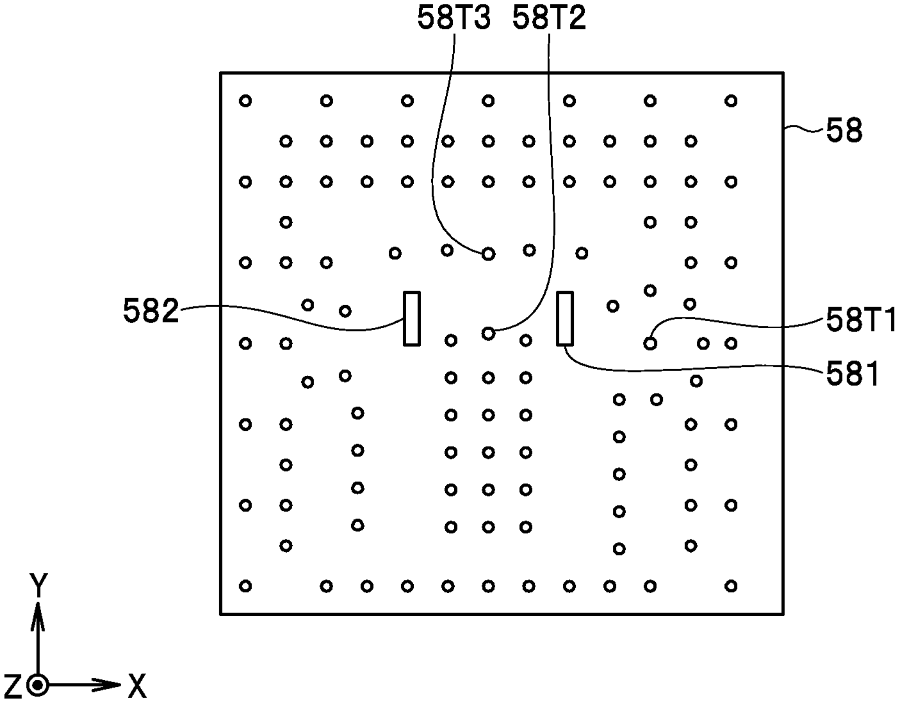
FIG. 5 is an explanatory diagram illustrating a patterned surface of an eighth dielectric layer in the stack of the multilayered filter device according to the first embodiment of the present invention.

FIG. 5 illustrates a patterned surface of the eighth dielectric layer 58. Conductor layers 581 and 582 are formed on the patterned surface of the dielectric layer 58. Particular through holes 58T1, 58T2, and 58T3 are formed in the dielectric layer 58. The particular through holes 52T1 to 52T3 formed in the dielectric layer 57 are connected to the particular through holes 58T1 to 58T3, respectively.

Figure 6:
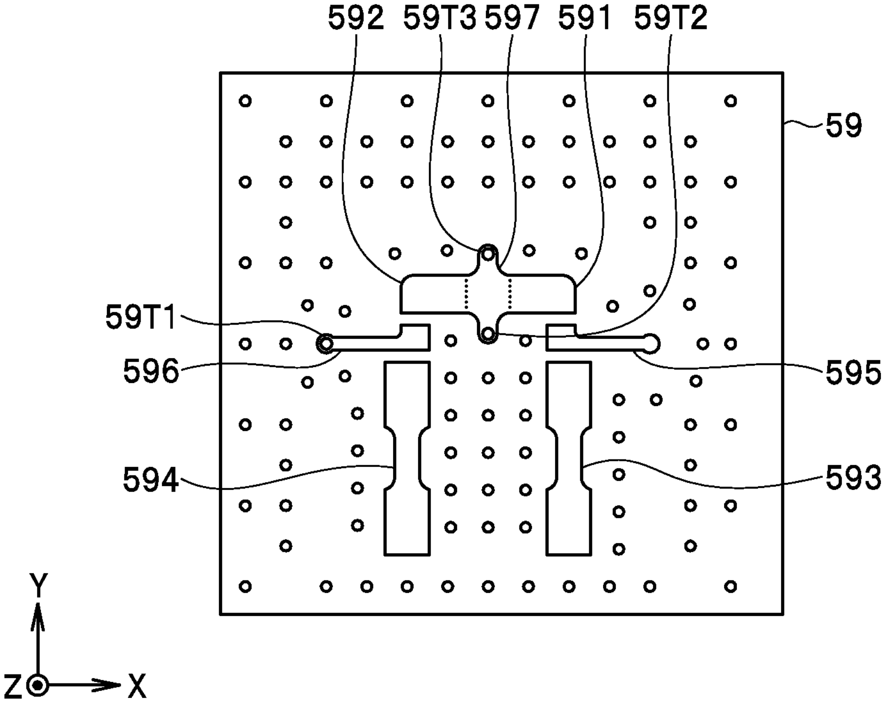
FIG. 6 is an explanatory diagram illustrating a patterned surface of a ninth dielectric layer in the stack of the multilayered filter device according to the first embodiment of the present invention.

FIG. 6 illustrates a patterned surface of the ninth dielectric layer 59. Resonator conductor layers 591, 592, 593, and 594 and conductor layers 595 and 596, and a ground conductor layer 597 are formed on the patterned surface of the dielectric layer 59. Each of the conductor layers 591 to 596 has a first end and a second end located opposite to each other.

The conductor layers 591 and 595 each extend from the first end toward the second end in the −X direction. The conductor layers 592 and 596 each extend from the first end toward the second end in the X direction. The conductor layers 593 and 594 each extend from the first end toward the second end in the −Y direction.

Particular through holes 59T1, 59T2, and 59T3 are formed in the dielectric layer 59. The particular through hole 59T1 is connected to a portion of the conductor layer 596 near the first end thereof. The particular through hole 58T1 formed in the dielectric layer 58 is connected to a portion of the conductor layer 595 near the first end thereof. The particular through holes 58T2 and 58T3 formed in the dielectric layer 58 and the particular through holes 59T2 and 59T3 are connected to the ground conductor layer 597.

The portion near the first end of the conductor layer 591 is at a predetermined distance from and adjacent to a portion of the conductor layer 595 near the second end thereof. The portion near the first end of the conductor layer 592 is at a predetermined distance from and adjacent to a portion of the conductor layer 596 near the second end thereof. The second ends of the conductor layers 591 and 592 are connected to the ground conductor layer 597. In FIG. 6, the boundary between each of the conductor layers 591 and 592 and the ground conductor layer 597 is indicated by a dotted line.

The first end of the conductor layer 593 is at a predetermined distance from and adjacent to a portion of the conductor layer 595 near the second end thereof. The first end of the conductor layer 594 is at a predetermined distance from and adjacent to a portion of the conductor layer 596 near the second end thereof.

Figure 7:
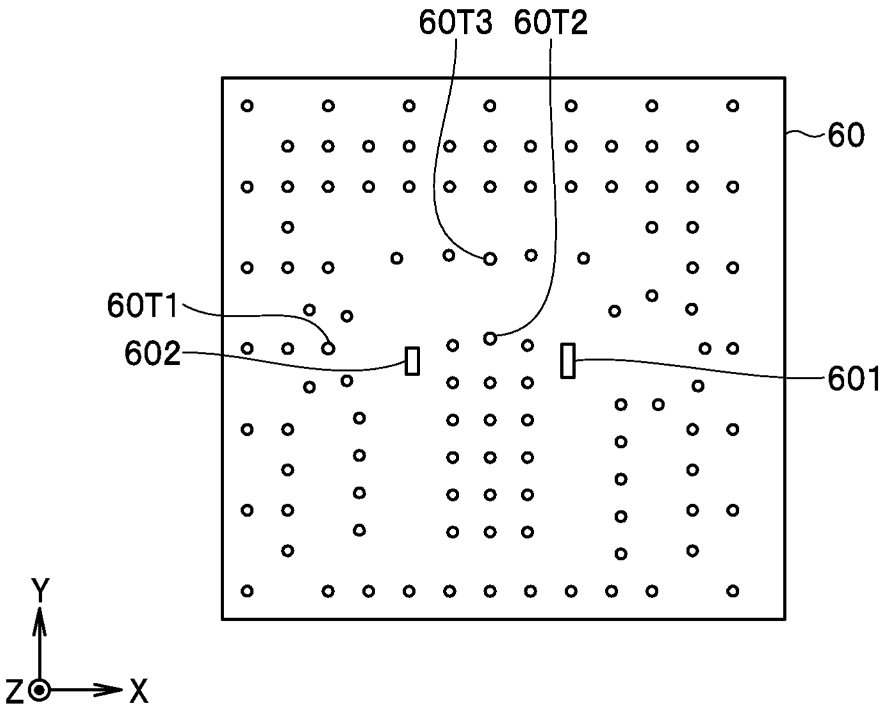
FIG. 7 is an explanatory diagram illustrating a patterned surface of a tenth dielectric layer in the stack of the multilayered filter device according to the first embodiment of the present invention.

FIG. 7 illustrates a patterned surface of the tenth dielectric layer 60. Conductor layers 601 and 602 are formed on the patterned surface of the dielectric layer 60. Particular through holes 60T1, 60T2, and 60T3 are formed in the dielectric layer 60. The particular through holes 59T1 to 59T3 formed in the dielectric layer 59 are connected to the particular through holes 60T1 to 60T3, respectively.

Figure 8:
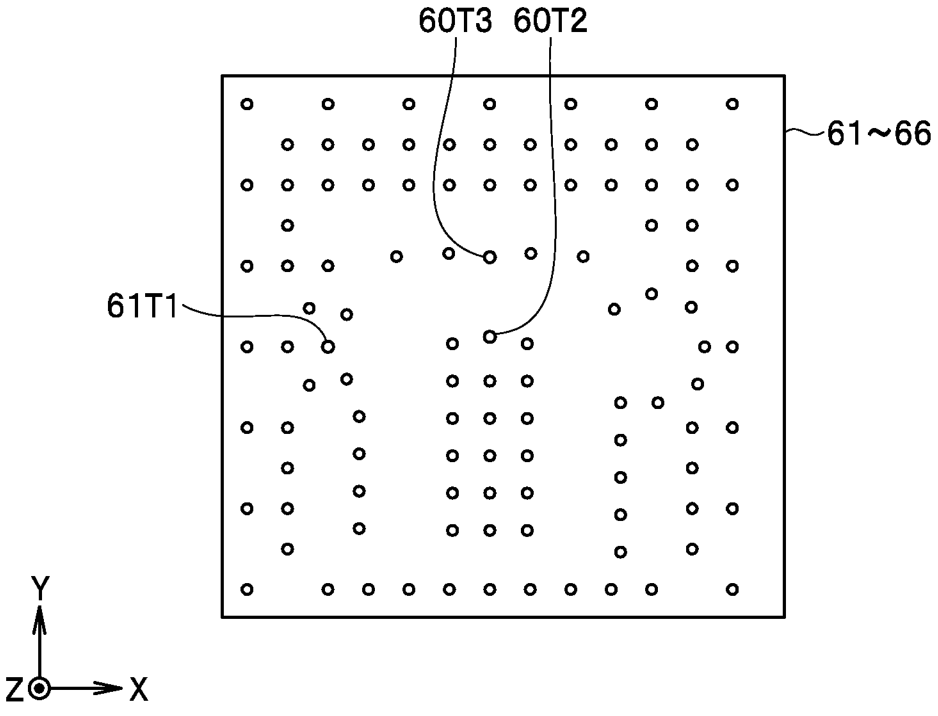
FIG. 8 is an explanatory diagram illustrating a patterned surface of each of eleventh to sixteenth dielectric layers in the stack of the multilayered filter device according to the first embodiment of the present invention.

FIG. 8 illustrates a patterned surface of each of the eleventh to sixteenth dielectric layers 61 to 66. Particular through holes 61T1, 61T2, and 61T3 are formed in each of the dielectric layers 61 to 66. The particular through holes 60T1 to 60T3 formed in the dielectric layer 60 are connected respectively to the particular through holes 61T1 to 61T3 formed in the dielectric layer 61. In the dielectric layers 61 to 66, every vertically adjacent through holes denoted by the same reference signs are connected to each other.

Figure 9:
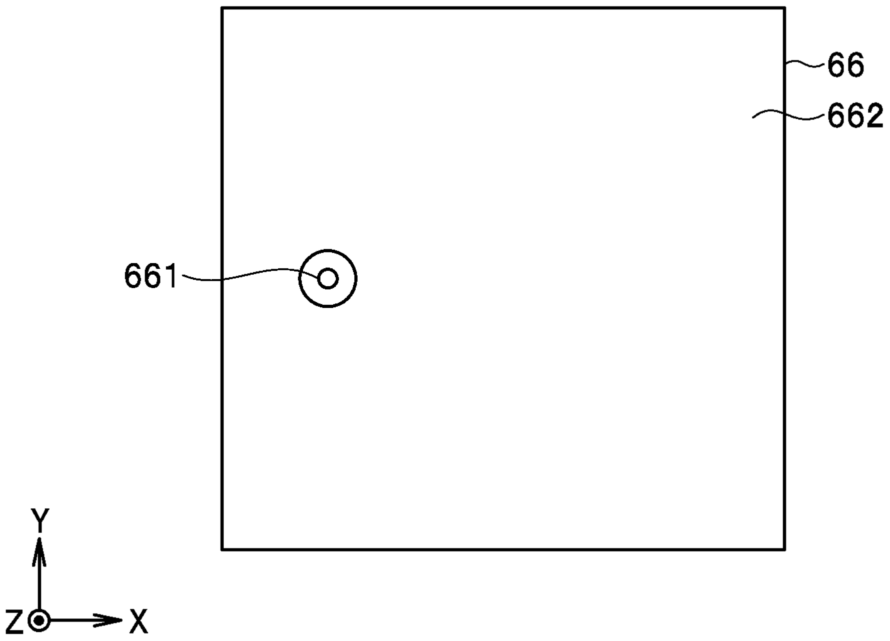
FIG. 9 is an explanatory diagram illustrating a terminal-formed surface of a sixteenth dielectric layer in the stack of the multilayered filter device according to the first embodiment of the present invention.

FIG. 9 illustrates a terminal-formed surface being a surface opposite to the patterned surface of the sixteenth dielectric layer 66. The terminal 661 and the ground conductor layer 662 are formed on the terminal-formed surface of the dielectric layer 66. The particular through hole 61T1 formed in the dielectric layer 66 is connected to the terminal 661. A plurality of through holes formed in the dielectric layer 66 including the particular through holes 61T2 and 61T3 formed in the dielectric layer 66 (excluding the particular through hole 61T1) are connected to the ground conductor layer 662.

The stack 50 illustrated in FIG. 2 is formed by stacking the first to sixteenth dielectric layers 51 to 66 such that the patterned surface of the first dielectric layer 51 also serves as the bottom surface 50A of the stack 50 and the terminal-formed surface of the sixteenth dielectric layer 66 also serves as the top surface 50B of the stack 50.

Figure 10:
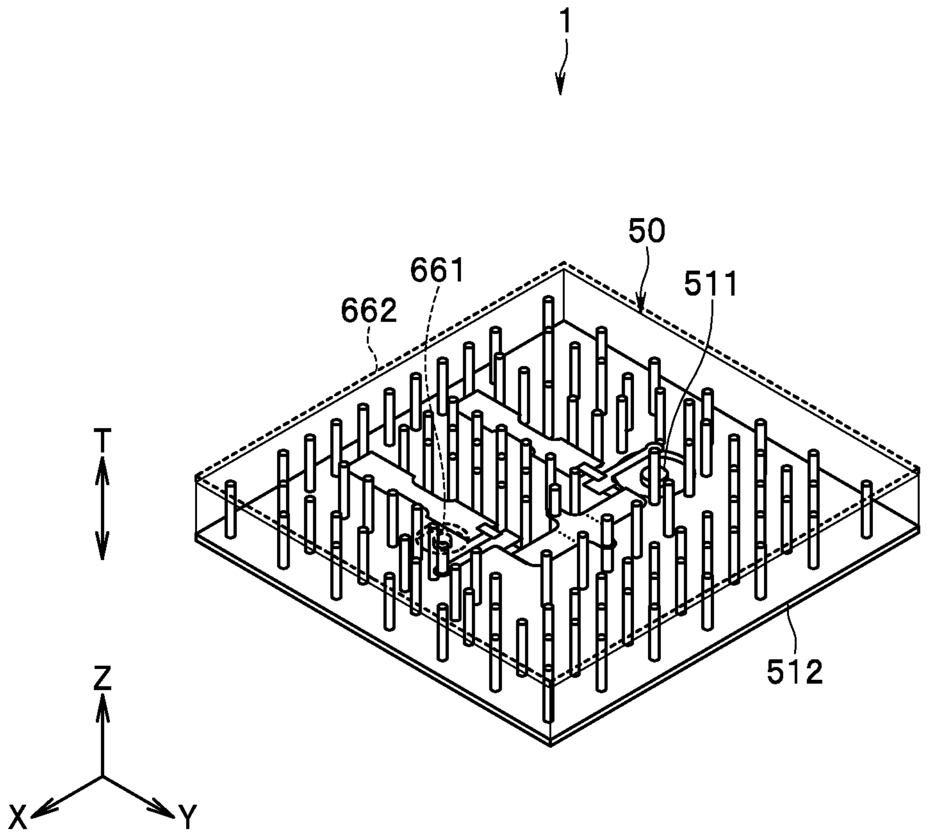
FIG. 10 is a perspective view illustrating inside of the stack of the multilayered filter device according to the first embodiment of the present invention.

FIG. 10 illustrates inside of the stack 50 formed by stacking the first to sixteenth dielectric layers 51 to 66. As illustrated in FIG. 10, the plurality of conductor layers and the plurality of through holes illustrated in FIG. 3 to FIG. 9 are stacked inside the stack 50. The conductor layer 595 is connected to the terminal 511 via the particular through holes 51T1, 52T1, and 58T1. The conductor layer 596 is connected to the terminal 661 via the particular through holes 59T1, 60T1, and 61T1. The ground conductor layers 512, 597, and 662 are connected by the plurality of through holes excluding the particular through holes 51T1, 52T1, 58T1, 59T1, 60T1, and 61T1. In particular, the ground conductor layer 597 is connected to the ground conductor layer 512 via the particular through holes 51T2, 51T3, 52T2, 52T3, 58T2, and 58T3 and is connected to the ground conductor layer 662 via the particular through holes 59T2, 59T3, 60T2, 60T3, 61T2, and 61T3.

Correspondences of the components of the filter device 1 illustrated in FIG. 1 with the components in the stack 50 illustrated in FIG. 4 to FIG. 8 will now be described. The first resonator 11 of the first resonant circuit 10 is formed of the resonator conductor layer 591. The first resonator 12 of the first resonant circuit 10 is formed of the resonator conductor layer 592. The second resonator 21 of the second resonant circuit 20 is formed of the resonator conductor layer 593. The second resonator 22 of the second resonant circuit 20 is formed of the resonator conductor layer 594.

The first capacitor C11 is formed of the conductor layers 581, 591, and 595 and the dielectric layer 58 between these conductor layers. The first capacitor C12 is formed of the conductor layers 582, 592, and 596 and the dielectric layer 58 between these conductor layers. The second capacitor C21 is formed of the conductor layers 593, 595, and 601 and the dielectric layer 59 between these conductor layers. The second capacitor C22 is formed of the conductor layers 594, 596, and 602 and the dielectric layer 59 between these conductor layers.

The structural features of the filter device 1 in the present embodiment will now be briefly described. In the filter device 1, the resonator conductor layers 591 to 594 are provided in a space surrounded by the ground conductor layers 512 and 662 and the plurality of through holes.

In the filter device 1, the area of each of the conductor layers 601 and 602 constituting the second capacitors C21 and C22 respectively is smaller than the area of each of the conductor layers 581 and 582 constituting the first capacitors C11 and C12 respectively.

The particular through holes 51T2, 51T3, 52T2, 52T3, 58T2, 58T3, 59T2, 59T3, 60T2, 60T3, 61T2, and 61T3 are electrically connected to the ground conductor layers 512, 597, and 662. The ground conductor layers 512, 597, and 662 are electrically connected to the ground. In the following, the particular through holes 51T2, 51T3, 52T2, 52T3, 58T2, 58T3, 59T2, 59T3, 60T2, 60T3, 61T2, and 61T3 are referred to as a plurality of particular through holes connected to the ground.

The plurality of particular through holes connected to the ground include two through holes arranged in a direction orthogonal to the stacking direction T. The two through holes are concretely a pair of particular through holes 71T2 and 71T3, a pair of particular through holes 72T2 and 72T3, a pair of particular through holes 78T2 and 78T3, a pair of particular through holes 79T2 and 79T3, a pair of particular through holes 80T2 and 80T3, or a pair of particular through holes 81T2 and 81T3. The two particular through holes included in these pairs are arranged in a direction orthogonal to at least one of the direction in which the resonator conductor layer 591 extends and the direction in which the resonator conductor layer 592 extends to be described later. In the present embodiment, the two particular through holes included in these pairs are arranged in a direction parallel to the Y direction.

The resonator conductor layer 591 extends in a first direction becoming away from the plurality of particular through holes connected to the ground. The resonator conductor layer 591 extends in a second direction becoming away from the plurality of particular through holes connected to the ground. In the present embodiment, in particular, the resonator conductor layers 591 and 592 are each electrically connected to the plurality of particular through holes connected to the ground.

The first and second directions are each a direction orthogonal to the stacking direction T. In the present embodiment, in particular, the first direction is the X direction, and the second direction is the −X direction. Hence, the first direction and the second direction are directions opposite to each other.

The resonator conductor layers 593 and 594 each include a narrow portion and two wide portions located at both sides of the narrow portion. The second resonators 21 and 22 formed of the resonator conductor layers 593 and 594 are each a stepped impedance resonator.

The function and effects of the filter device 1 according to the present embodiment will now be described. In the present embodiment, the resonator conductor layers 591 and 592 each extend in the direction becoming away from the plurality of particular through holes connected to the ground as described above. Hence, in the present embodiment, when the resonator conductor layers 591 and 592 or the plurality of particular through holes connected to the resonator conductor layers 591 and 592 are shifted in a direction parallel to the X direction due to manufacturing variations, one of the resonator conductor layers 591 and 592 becomes longer while the other becomes shorter. With this, according to the present embodiment, it is possible to cancel characteristic change of resonators attributable to change in length of the resonator conductor layers. Consequently, according to the present embodiment, it is possible to suppress characteristic change of the first resonant circuit 10, i.e., the band-pass filter, due to manufacturing variations.

In the present embodiment, the plurality of particular through holes connected to the ground include the two through holes arranged in a direction orthogonal to the stacking direction T and also orthogonal to at least one of the direction in which the resonator conductor layer 591 extends and the direction in which the resonator conductor layer 592 extends. In the present embodiment, in particular, the two through holes are arranged in a direction orthogonal to both the direction in which the resonator conductor layer 591 extends and the direction in which the resonator conductor layer 592 extends. Hence, when the resonator conductor layers 591 and 592 or the plurality of particular through holes connected to the resonator conductor layers 591 and 592 are shifted in a direction parallel to the Y direction, the resonator conductor layers 591 and 592 change little in length. Also with this, according to the present embodiment, it is possible to suppress characteristic change of the first resonant circuit 10, i.e., the band-pass filter, due to manufacturing variations.

Now, the foregoing effects of the present embodiment will be described with reference to results of a simulation. In the simulation, a model of an example and a model of a comparative example were used. The model of the example and the model of the comparative example are both models of a band-pass filter including a ground conductor layer and two resonator conductor layers extending from the ground conductor layer.

In the model of the example, as in the filter device 1 according to the present embodiment, the two resonator conductor layers are arranged so as to sandwich the ground conductor layer and extend in directions opposite to each other. In the model of the comparative example, the two resonator conductor layers extend from the ground conductor layer in the same direction. Note that, in the simulation, the longitudinal direction of the resonator conductor layers (directions parallel to the extending directions) were the same between the model of the example and the model of the comparative example. In the simulation, the length of each of the two resonator conductor layers of the model of the example was 700 μm, and the length of each of the two resonator conductor layers of the model of the comparative example was 855 μm.

In the simulation, obtained were the shift amount of the low-frequency cutoff, which is the lower limit of the passband, and the shift amount of the high-frequency cutoff, which is the upper limit of the passband, when the two resonator conductor layers were shifted by 15 μm in the longitudinal direction of the resonator conductor layers. In the model of the example, when the two resonator conductor layers are shifted by 15 μm in the longitudinal direction of the resonator conductor layers, one of the two resonator conductor layers becomes shorter by 15 μm while the other becomes longer by 15 μm. In the model of the comparative example, when the two resonator conductor layers are shifted by 15 μm in the longitudinal direction of the resonator conductor layers, both of the two resonator conductor layers become shorter by 15 μm or become longer by 15 μm. In the simulation, the two resonator conductor layers were shifted so that both of the two resonator conductor layers would become longer.

In a case where the two resonator conductor layers were shifted as described above, the shift amount of the low-frequency cutoff was 0.80% while the shift amount of the high-frequency cutoff was 1.25% in the model of the comparative example. In the model of the example, the shift amount of the low-frequency cutoff was 0.11% while the shift amount of the high-frequency cutoff was 0.11%. As understood from the results of the simulation, according to the present embodiment, it is possible to suppress change in low-frequency cutoff and high-frequency cutoff due to manufacturing variations.

The other effects of the filter device 1 in the present embodiment will now be described. As described above, in the present embodiment, the coupling of the second resonant circuit 20 and the two ports 3 and 4 is weaker than the coupling of the first resonant circuit 10 and the two ports 3 and 4. With this, according to the present embodiment, it is possible to incorporate the second resonant circuit 20 into the filter device 1 while suppressing the effect of the second resonant circuit 20.

In the present embodiment, in particular, the first resonant circuit 10 configures a band-pass filter, and the second resonant circuit 20 configures a band elimination filter. The effect of the second resonant circuit 20 is concretely to increase, in frequency response of the insertion loss of the filter device 1 (frequency response of the insertion loss of the band-pass filter), the insertion loss of the frequency region close to the center frequency of the stop band of the band elimination filter by the second resonant circuit 20. Hence, according to the present embodiment, it is possible to incorporate the second resonant circuit 20 into the filter device 1 while reducing the insertion loss in the frequency region to a required amount. Hence, according to the present embodiment, the center frequency of the stop band of the band elimination filter configured by the second resonant circuit 20 is adjusted to a frequency close to the passband of the band-pass filter configured by the first resonant circuit 10, to thereby be able to obtain characteristics of abrupt change of the insertion loss in the frequency region close to the passband of the filter device 1, while suppressing an increase of the insertion loss of the passband of the filter device 1.

Note that, also by increasing the number of resonators configuring the band-pass filter, it is possible to obtain characteristics of abrupt change of insertion loss in a frequency region close to the passband of the band-pass filter. However, there occurs a problem that the insertion loss of the passband increases as the number of resonators increases when comparison is made with the resonators having the same Q value.

In contrast to this, in the present embodiment, the number of resonators included in the first resonant circuit 10 is only two. According to the present embodiment, it is possible to obtain characteristics of abrupt change of insertion loss in a frequency region close to the passband without increasing the number of resonators constituting the band-pass filter.

With this, according to the present embodiment, it is possible to suppress an increase of insertion loss of the passband. According to the present embodiment, it is possible to miniaturize the filter device 1.

The center frequency of the stop band of the band elimination filter configured by the second resonant circuit 20 may be present in a lower frequency region from the passband of the band-pass filter configured by the first resonant circuit 10 or may be present in a higher frequency region from the passband.

Second Embodiment

Figure 11:
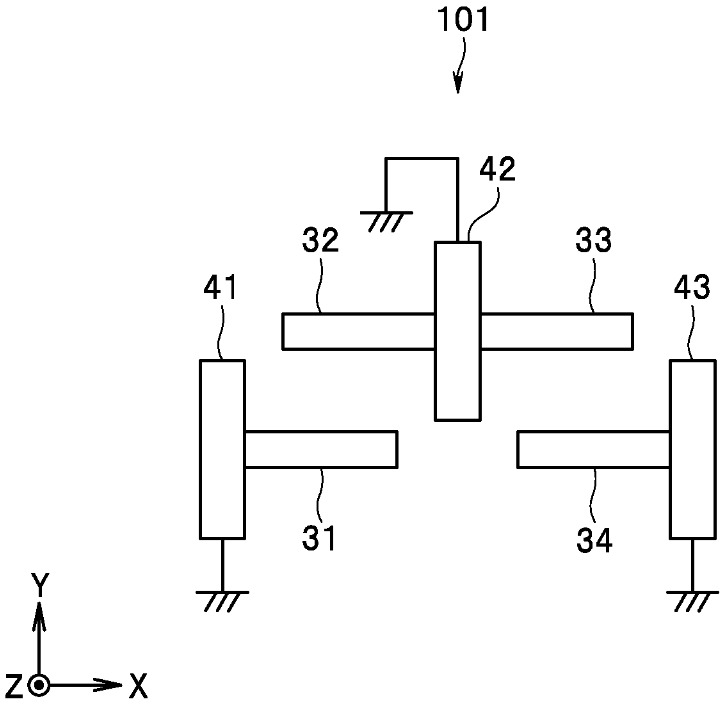
FIG. 11 is an explanatory diagram schematically illustrating a configuration of a multilayered filter device according to a second embodiment of the present invention.

Reference is now made to FIG. 11 to describe a second embodiment of the present invention. FIG. 11 is an explanatory diagram schematically illustrating a configuration of a filter device 101 according to the present embodiment.

The filter device 101 according to the present embodiment is a band-pass filter including four resonators 31, 32, 33, and 34. Each of the resonators 31 to 34 is a quarter-wave resonator with one end being short-circuited and the other end being open and is configured by a resonator conductor layer extending in one direction. In the following description, when an expression, resonator, is used, this indicates at least one of a resonator and a resonator conductor layer.

The filter device 101 further includes ground conductor portions 41, 42, and 43 each electrically connected to the ground. Each of the ground conductor portions 41 to 43 includes a ground conductor layer electrically connected to the ground and at least one through hole electrically connected to the ground conductor layer. Each of the ground conductor portions 41 to 43 as a whole extends in a direction parallel to the Y direction.

One end of the resonator 31 is connected to the ground conductor portion 41. The resonator 31 extends from the ground conductor portion 41 in the X direction.

The resonators 32 and 33 are arranged so as to sandwich the ground conductor portion 42. One end of each of the resonators 32 and 33 is connected to the ground conductor portion 42. The resonator 32 extends from the ground conductor portion 42 in the −X direction. The resonator 33 extends from the ground conductor portion 42 in the X direction.

One end of the resonator 34 is connected to the ground conductor portion 43. The resonator 34 extends from the ground conductor portion 43 in the −X direction.

The resonator 31 is magnetically coupled with the resonator 32, and the resonator 32 is magnetically coupled with the resonator 31, and the resonator 33 is magnetically coupled with the resonator 34.

Note that, in the present embodiment, the other end of the resonator 34 faces the other end of the resonator 31.

In the present embodiment, when the resonators 32 and 33 or the ground conductor portion 42 is shifted in a direction parallel to the X direction due to manufacturing variations, one of the resonators 32 and 33 is longer while the other is shorter. Similarly, when the resonators 31 and 34 or the ground conductor portions 41 and 43 are shifted in a direction parallel to the X direction due to manufacturing variations, one of the resonators 31 and 34 is longer while the other is shorter. With these, according to the present embodiment, it is possible to cancel characteristic change of the resonators 31 to 34. Consequently, according to the present embodiment, it is possible to suppress characteristic change of the filter device 101 due to manufacturing variations.

In the present embodiment, each of the ground conductor portions 41 to 43 as a whole extends in a direction parallel to the Y direction. Hence, when the resonators 31 to 34 or the ground conductor portions 41 to 43 are shifted in a direction parallel to the Y direction, each of the resonators 31 to 34 changes little in length. Also with this, according to the present embodiment, it is possible to suppress characteristic change of the filter device 101 due to manufacturing variations.

[Variation]

Figure 12:
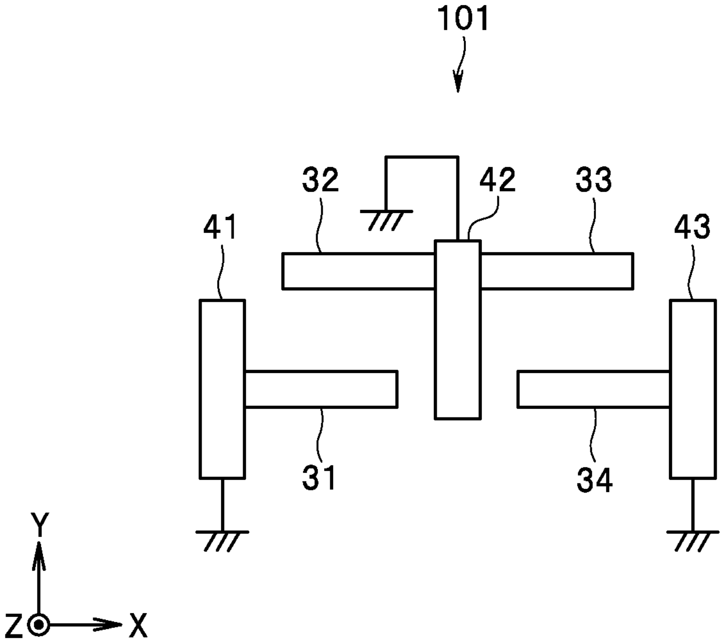
FIG. 12 is an explanatory diagram schematically illustrating a configuration of a variation of the multilayered filter device according to the second embodiment of the present invention.

Reference is now made to FIG. 12 to describe a variation of the filter device 101 according to the present embodiment. FIG. 12 is an explanatory diagram schematically illustrating a configuration of the variation of the filter device 101 according to the present embodiment. In the variation, a ground conductor portion 42 is present between the resonator 31 and the resonator 34.

The other configuration, function, and effects of the present embodiment are the same as those of the first embodiment.

Note that the present invention is not limited to the foregoing embodiments, and various modifications may be made thereto. For example, the number and the configuration of each of the first and second resonators are not limited to those illustrated in the foregoing embodiments, and can be freely chosen as far as the requirements of the appended claims are met. Each of the number of first resonators and the number of second resonators may be three or more.

The first resonant circuit 10 is not limited to a band-pass filter and may be a circuit configuring another filter such as a low-pass filter or a high-pass filter.

The first direction may be a direction inclined from the X direction toward the Y direction or the −Y direction without being limited to the X direction. Similarly, the second direction may be a direction inclined from the −X direction toward the Y direction or the −Y direction without being limited to the −X direction. The angle between the first direction and the second direction may be larger than 90 degrees and smaller than 180 degrees.

Obviously, many modifications and variations of the present invention are possible in the light of the above teachings. Thus, it is to be understood that, within the scope of the appended claims and equivalents thereof, the present invention may be practiced in other embodiments than the foregoing most preferable embodiments.

What is claimed is:

1. A multilayered filter device comprising:

a ground conductor layer electrically connected to ground;

at least one through hole electrically connected to the ground conductor layer;

a first resonator conductor layer and a second resonator conductor layer arranged to sandwich the ground conductor layer; and a stack including a plurality of dielectric layers stacked together and being for integrating the ground conductor layer, the at least one through hole, the first resonator conductor layer, and the second resonator conductor layer, wherein the first resonator conductor layer extends in a first direction extending away from the at least one through hole, the second resonator conductor layer extends in a second direction extending away from the at least one through hole, and one end of each of the first resonator conductor layer and the second resonator conductor layer is connected to the ground conductor layer.

2. The multilayered filter device according to claim 1, wherein each of the first resonator conductor layer and the second resonator conductor layer configures a resonator with one end being short-circuited and another end being open.

3. The multilayered filter device according to claim 2, wherein each of the first resonator conductor layer and the second resonator conductor layer is electrically connected to the at least one through hole.

4. The multilayered filter device according to claim 1, wherein the at least one through hole includes a plurality of through holes, the plurality of through holes are arranged in a direction orthogonal to at least one of the first direction or the second direction, and the direction is orthogonal to a stacking direction of the plurality of dielectric layers.

5. The multilayered filter device according to claim 1, wherein the first direction and the second direction are directions opposite to each other.

6. The multilayered filter device according to claim 1, further comprising:

a third resonator conductor layer coupled with the first resonator conductor layer; and a fourth resonator conductor layer coupled with the second resonator conductor layer.

* * * * *